United States Patent

Reede

[15] 3,673,566

[45] June 27, 1972

[54] USE OF A PLURALITY OF SCANNING DIRECTIONS FOR CHARACTER CENTER LINE DETERMINATION

[72] Inventor: Thomas Pieter Reede, Rijswijk, Netherlands

[73] Assignee: U.S. Philips Corporation, New York, N.Y.

[22] Filed: May 5, 1970

[21] Appl. No.: 34,651

[30] Foreign Application Priority Data

May 10, 1969 Netherlands..........................6907226

[52] U.S. Cl...........340/146.3 AE, 340/146.3 F, 340/146.3 J, 235/198, 250/217 CR

[51] Int. Cl..........................................................G06k 9/04

[58] Field of Search.............340/146.3; 235/61.6 A, 61.6 B, 235/92 PC; 250/217 CR, 219 CR

[56] References Cited

UNITED STATES PATENTS

| | | | |
|---|---|---|---|
| 3,504,342 | 3/1970 | Scarrott et al | 340/146.3 AH |
| 3,261,968 | 7/1966 | Gale | 235/92 |
| 3,346,845 | 10/1967 | Fomenko | 340/146.3 Y |
| 3,560,928 | 2/1971 | Berger et al. | 340/146.3 |

*Primary Examiner*—Maynard R. Wilbur
*Assistant Examiner*—William W. Cochran
*Attorney*—Frank R. Trifari

[57] ABSTRACT

Device for determining the character center line i.e. the line interconnecting the centers of the line elements of a character, comprising a part for displaying a character characterized in that a scanner is provided for scanning the character throughout the character surface in at least two orthogonal directions, a detecting device is provided for determining per scan an intersection of a character line element, while by further detecting circuitry the centers of said intersections can be determined, the set of the centers thus obtained forming the character center line (FIG. 5). The device may furthermore comprise a checking device for suppressing dark signals of too long a duration and/or light and dark signals of too short a duration.

7 Claims, 6 Drawing Figures

INVENTOR.
THOMAS P. REEDE
BY
Frank R. Trifari
AGENT

INVENTOR.
THOMAS P. REEDE
BY
AGENT

INVENTOR.
THOMAS P. REEDE
BY
AGENT

INVENTOR.
THOMAS P. REEDE
BY
AGENT

USE OF A PLURALITY OF SCANNING DIRECTIONS FOR CHARACTER CENTER LINE DETERMINATION

The invention relates to a device for determining the character center line, i.e. the line connecting the centers of the line elements of a character, comprising a component on which a character can be reproduced. Printed, written or otherwise reproduced characters comprise for recognition a plurality of redundant information. The thickness of the character line elements does not provide information required for automatic recognition of a character. Moreover, in thickness many variations appear, for example, in the form of thickened and thinned portions, in accordance with the quality of reproduction, which render automatic recognition difficult or even impossible. In automatical character recognition it is therefore very advantageous to determine prior to the recognizing process, the basic form of a character, i.e. the minimized thin form of a character, which is then available for recognition. In order to detect the basic form of a character it is efficient to use the centers of the line elements of a character. The set of the centers of the line elements, the so-called character center line, is satisfactorily representative of the basic form of the character. It is therefore efficient, prior to the start of the recognizing process, to determine automatically the character center line of a character reproduced on a part, for example, a light-sensitive element. The invention has for its object to provide a device by which the character center line can be determined simply but accurately and is characterized in that first means are provided for scanning the character throughout the surface thereof in at least two transverse directions and second means are provided to assess in each scan an intersection of a character line element and third means are capable of determining the center of these intersections, the resultant set of center thus obtained providing the character center line. With the aid of the character center line thus determined the known recognition logics can provide a more successful recognition than by starting from the character as such. It is essential for determining the character center line in the device in accordance with the invention to scan a character in at least two transverse directions. If a character is scanned in only one direction, it may occur that a character line element is located in the same direction. This applies, for example, to the character 5, the upper line element of which is located in the same direction as the horizontal scan. This means that of this element only the centers of the length are determined and the centers of the width are not determined. A true reproduction of the charac-ter center line is not obtained in this manner.

A component for reproducing a character may be a magnetic matrix of cores whose 0- or 1-states may be determined for example from photocells, on which the character is optically displayed. The rows and columns of a matrix provide by known selection the possibility of performing scans in two orthogonal directions. For each row and column it can be assessed which matrix elements are representative of the center of a sequence of adjacent matrix elements "covered" by a character line element. The addresses of these elements in the matrix constitute the co-ordinates of the relevant centers of the character line elements.

In order to attain high rates of operation without rendering the device excessively expensive or complicated it is very effective to use a light-sensitive element adapted to be scanned by an electron beam controlled by a sawtooth generator and a step generator, a video signal appearing at the output at a scan of the character reproduced thereon (vidicon, plumbicon, cathode-ray tube with a photomultiplier). One embodiment of the invention comprising such a light-sensitive element is characterized in that the sawtooth generator and the step generator serve for scanning in at least two transverse directions, while a detector is provided for detecting the light-to-dark and dark-to-light transitions in the video signal, which occur at the intersections of the character line elements in each scan of one of the at least two scanning directions. An auxiliary sawtooth generator provides under the control of the detector, during an intersection, an auxiliary sawtooth whose steepness is equal to half the steepness of the former sawtooth, while in a summation device the instantaneous and auxiliary sawtooth voltages are joined, the sum voltage having at the termination of the auxiliary sawtooth, a value representative of the place of the center of the intersection in a given scan in the scanning direction concerned.

The resultant sum voltages may be further processed in various ways. It is possible, for example, to provide a display device on which the sum voltages representative of the centers can be reproduced synchronously with the scans. It is also possible to provide a memory store in which the sum voltages representative of the character line centers of a scan are stored subsequent to digitalization in an analogue-digital converter with the aid of the counter position of a scanning line counter related to said scan.

With the aid of a light-sensitive element of the kind set forth, adapted to be scanned by an electron beam controlled by a sawtooth generator and a step generator and providing a video signal at the output said video signal can be digitally processed in a further, very interesting device embodying the invention. This embodiment is characterized in that the sawtooth generator and the step generator are used for scanning in at least two transverse directions and a detector is provided for detecting the light-dark transitions of the video signal occurring during the scan of the characters. A first counter is provided, which is completely filled per scan in each of at least two transverse scanning directions by a clock pulse. A second counter follows the first counter but counts further with half the clock pulse frequency under the control of the detector during an intersection of a character line element. At the termination of the intersection the position of the second counter as a digital representation of the center of a character line element in a scan in the direction concerned and the counter position of a scanning line counter can be read as center coordinates and at the end of an intersection the second counter takes over the position of the first counter.

With respect to the rate of determination of the character center line it should be noted that it depends mainly on the periods required for scanning of a reproduced character in at least two transverse directions. The scanning rate in a vidicon or plumbicon is high. However, if a further increase in speed is required, it is possible to use in the device according to the invention two light-sensitive elements displaying a character, which can be scanned simultaneously on the first light-sensitive element in a first direction and on the second light-sensitive element in a second direction transverse of the former.

By a slight extension of the device according to the invention it is finally possible to ignore irrelevant light- and dark-signals representative of light spots in a dark region and dark spots in a light region or of a long dark region, the center of which cannot directly be considered to form a character center line. For this purpose the device according to the invention are characterized in that a first checking device is provided in which irrelevant light and dark signals of too short duration are suppressed for the determination of the center of a character line element and/of in that a second checking device is provided in which irrelevant center date of dark signals of two long a duration are suppressed.

The invention will be described more fully with reference to the drawings. In the drawings FIG. 1 illustrates a character with the associated character center line points, FIG. 2 shows a first embodiment of a device in accordance with the invention, FIG. 3 illustrates a few signal waveforms associated with the embodiment of FIG. 2,.

Figure 1:
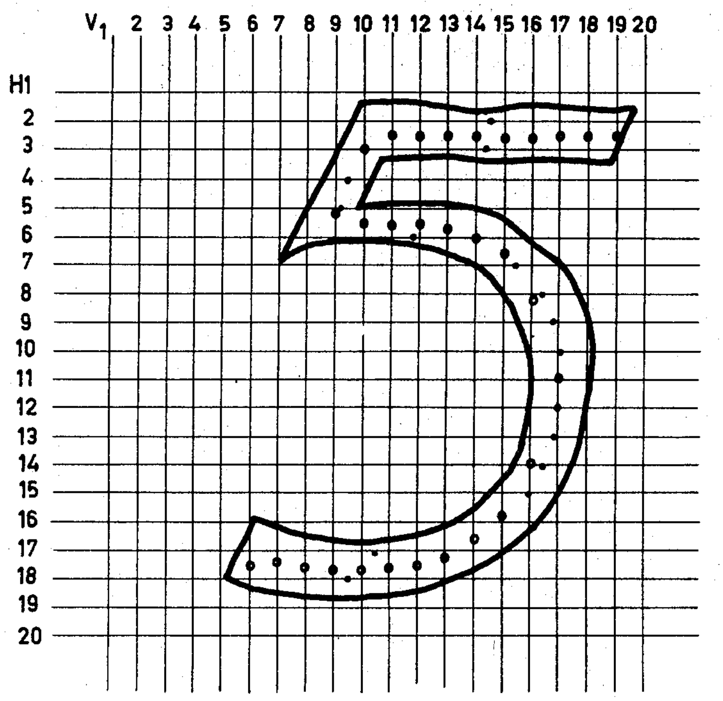

FIG. 1 shows as an example of a character the digit 5. The lines $V_{1-20}$ indicate possible scanning lines in the vertical scanning direction and the lines $H_{1-20}$ are the possible scanning lines in the horizontal direction. Closed dots on the horizontal lines inside the character indicate the centers of the intersections in the horizontal direction of the character line elements. Open dots on the vertical lines inside the character indicate the center of the intersections of the character line elements in the vertical direction.

From this Figure it will be obvious that if only scanning lines in the horizontal direction are used, only very little data can be extracted for the upper horizontal line element of the character 5. This also applies to scanning in only the vertical direction for more or less vertical character line elements. The whole set of dots (closed an open ones) provides a very satisfactory approximation of the character center line.

Figures 2, 3:
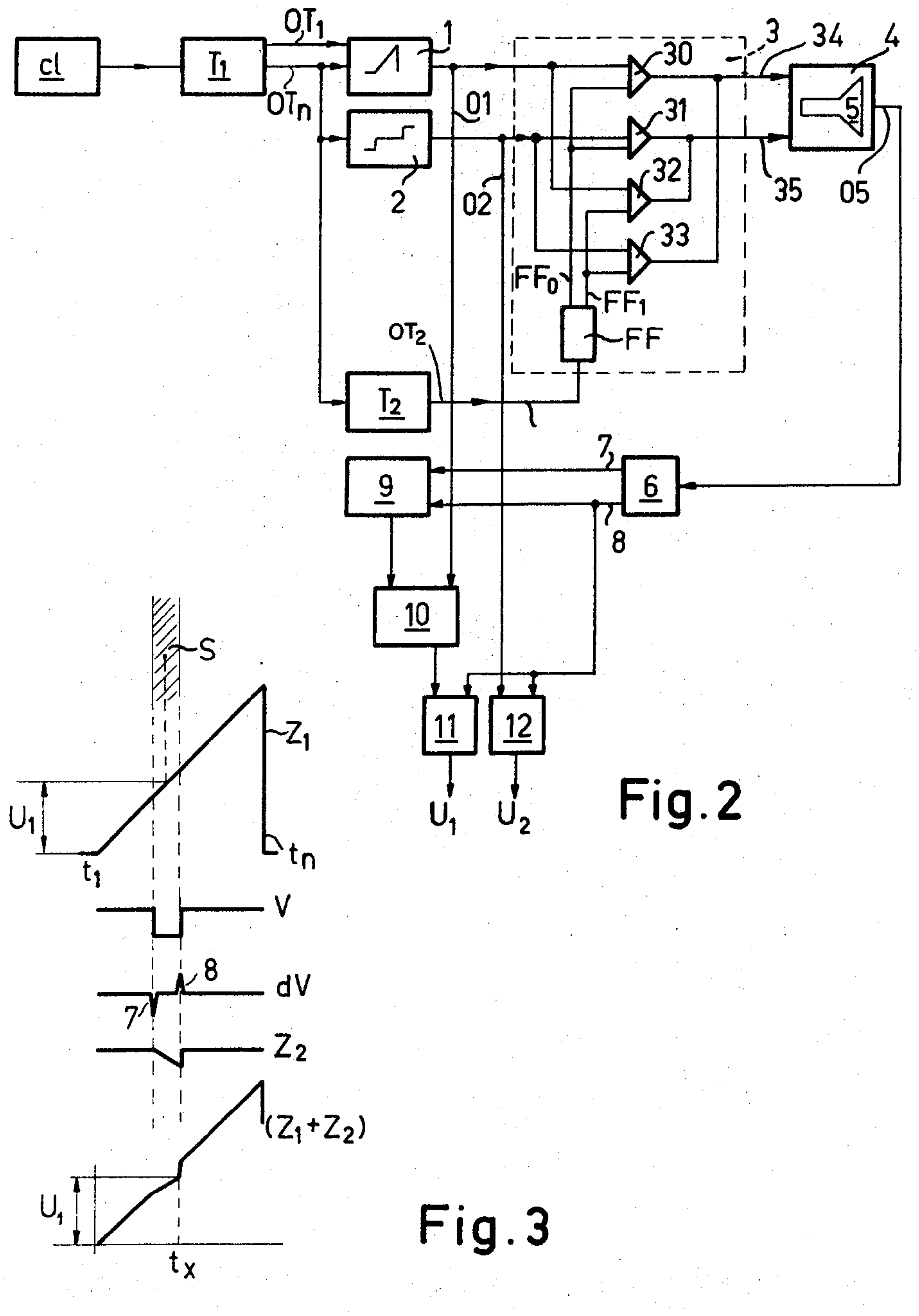

FIG. 2 shows an embodiment of a device in accordance with the invention. C1 designates a clock pulse generator, $T_1$ and $T_2$ designate dividers constructed as counters, 1 denotes a sawtooth generator, 2 a step generator, 3 an electronic switch, for example containing AND-gates 30, 31, 32 and 33 and a bistable trigger FF 4 designates a device for controlling the electron beam of a light-sensitive element 5, on which a character can be displayed. The light-sensitive element supplies a video signal at the output 05. 6 designates a light-dark and dark-light transition detector. 9 denotes an auxiliary sawtooth generator producing a sawtooth of a steepness equal to half the steepness of the sawtooth produced by the generator 1. 10 designates a voltage summation member and 11 and 12 are gating circuits. $U_1$ and $U_2$ are the output terminals of the device.

The operation will be explained hereinafter with reference to FIG. 3. FIG. 3 illustrates a number of signal waveforms: S is a character line element, $Z_1$ is the sawtooth voltage of generator 1, V is the video signal at the output 05 of the device 4, dV is the video signal after the detector 6, $Z_2$ is the auxiliary sawtooth voltage and $(Z_1 + Z_2)$ is the sum of the sawtooth voltages $Z_1$ and $Z_2$. The pulses of the clock pulse generator C1 are applied to the counter $T_1$. This counter supplies at the output $OT_1$ at an instant $t_1$ a pulse for the sawtooth generator 1, which is thus started (see FIG. 3: $Z_1$). After a fixed number of pulses $n$ ($n = 20$ for example) corresponding to a scan of the light-sensitive element 5, the counter $T_1$ supplies a stop pulse for the generator 1 at the output $OT_n$ at the instant $t_n$. At this instant also the step generator 2 is controlled from the counter $T_1$ and it supplies a voltage raised by a given step. The output 01 of the generator 1 supplies across the electronic switch 3 the control-voltage, for example, for the horizontal deflection of the electron beam of the device 4. The output 02 of the generator 2 then supplies across the electronic switch 3 the control-voltage for the vertical deflection. In this case the surface of the light-sensitive element 5 is scanned in the horizontal direction.

The counter $T_2$ receives also a pulse at each instant $t_n$. Then this counter (scanning line counter) counts the number of scanning lines in a given scanning direction. It should be noted that also the voltage of the step generator 2 provides a relevant indication. In a given position of the counter $T_2$ it supplies a pulse at the output $OT_2$ significant of the performance of a complete number of scans in a given direction. It is assumed that the scanning direction is horizontal. The bistable trigger FF of the electronic switch 3 is then in a state in which across the output $FF_0$ a 1-signal is applied to the AND-gates 30 and 31. At the output $FF_1$ then appears a 0-signal by which the AND-gates 32 and 33 are closed. The gate 30 also receives the sawtooth signal from the output 01 of the generator 1, which is passed as a horizontal deflection voltage through the output 34 to the device 4. The gate 31 also has the step voltage of the generator 2, which provides through the output 35 the vertical scan. If after a complete number of scans in the horizontal direction a signal appears at the output $OT_2$ of the counter $T_2$, the bistable trigger FF changes over and the output $FF_0$ then has a O-signal and the output $FF_1$ has a 1-signal. Thus the gates 32 and 33 are open so that across the output 34 the step voltage of the generator 2 is applied as a horizontal deflection voltage and across the output 35 the sawtooth voltage of the generator 1 is applied as a vertical deflection voltage to the device 4. In this way it is ensured that the light-sensitive element 5 is scanned in two orthogonal directions.

During a scan a video signal V (see FIG. 3) is produced at the output 05 and applied to the detector 6. In the detector 6 the light-dark transition (see FIG. 3 : 7) is detected and transmitted to the output 7. The dark-light transitions (see FIG. 3 : 8) also appear at the output 8. The auxiliary sawtooth generator 9 is started by the signal at the output 7 and is stopped by the signal at the output 8 (FIG. 3: $Z_2$). The steepness of $Z_2$ is half that of $Z_1$. In the summation member 10 the voltages $Z_1$ of generator 1 and $Z_2$ of generator 9 are added (FIG. 3: $(Z_1 + Z_2)$). At the instant $t_x$, when a dark-light transition pulse appears at the output 8 of the detector 6 the sum voltage $U_1$ is equal to $(Z_1 + Z_2)$, which is a measure for the place of the center of the character line element during the scan concerned.

The sum voltage $U_1$ is applied at the instant $t_x$ through the gate 11 controlled by the pulse at the output 8 of the detector 6. At this instant also a gate 12 passes the instantaneous step voltage $U_2$ of the generator 2. Thus voltages $U_1$ and $U_2$ are obtained, which are analogue values of the co-ordinates of the center point concerned. These voltages may be displayed synchronously with the scanning pattern of the device on a display device, for example, an oscillograph. The screen then shows the center points of the character line elements. If the definition of the scanning raster is sufficient, the set of centers forms the character center line, which can further be recognized as the recognizable character reproduction in a recognition device.

Figure 4:
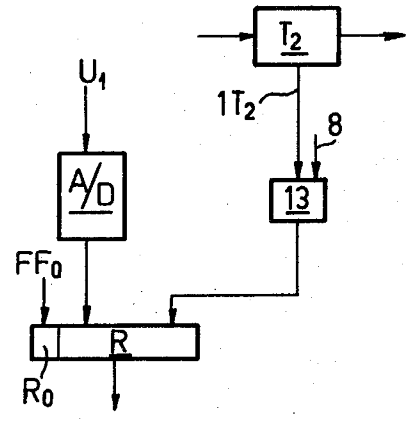
FIG. 4 shows an extension of the embodiment of FIG. 2.

As is shown in FIG. 4, the center co-ordinates may also be represented digitally. $U_1$ is converted in an analogue-digital converter A/D into a binary signal and applied to a register R. The scanning line associated with $U_1$, indicated by the voltage $U_2$, may also be digitized, but the position of the scanning line counter $T_2$ is already a binary representation thereof. The position of $T_2$ is also transferred to the register R at the output $1T_2$ at the instant $t_x$ by the gate 13, controlled by the output 8 of the detector 6. The part $R_0$ of register R obtains from the bistable trigger FF via the line $FF_0$ a signal 1 or 0 in order to indicate whether scanning is performed in a horizontal or in a vertical direction. In register R then appear in order of succession binary words representing unambiguously the co-ordinates of the centers. The output of register R may be connected directly or via a (register) store to the recognition logic. As an alternative the counter position of $T_2$ may serve directly as an address in a store, at which address the binary value(s) of $U_1$ per scanning line (due to a number of intersections in one scan there may be more than one) may be stored.

Figure 5:
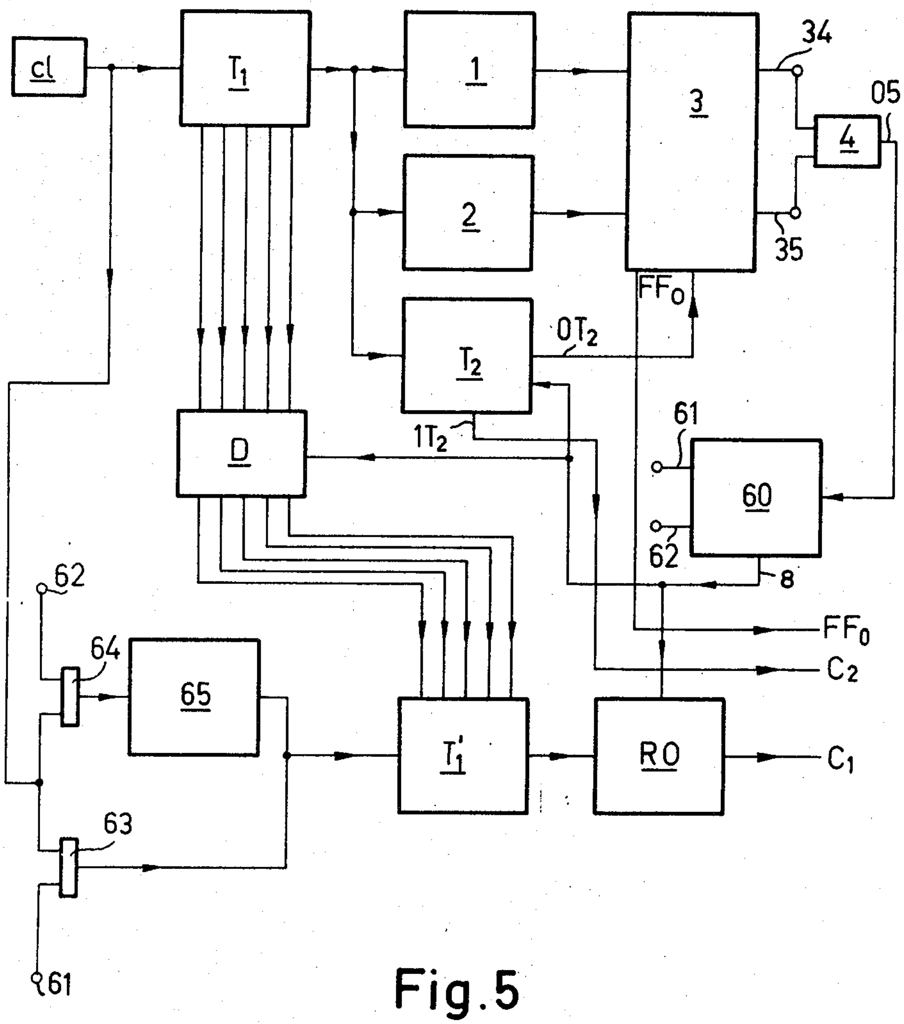
FIG. 5 shows a second embodiment of a device in accordance with the invention.

FIG. 5 shows how a digital processing of the video signal can provide in a simple manner the co-ordinates of centers. Corresponding parts are designated by the same references as in FIG. 2.

In this case the detector is indicated by 60. At the output 61 it provides a signal during a light signal and at the output 62 it supplies a signal during a dark signal. At the output 8 also appears a pulse at a dark-light transition. The device furthermore comprises a counter $T'_1$, which counts under the control of the clock pulses of generator C1, and this as long as the output 61 of detector 60 has a signal across the gate 63 with a frequency equal to the clock pulse frequency, whereas the output 62 of detector 60 has a signal across the gate 64 through a two-divider 65 with a frequency equal to half the clock pulse frequency. At the instant when a dark-light transition pulse appears at the output 8 of the detector, the counter $T'_1$ is read via a read gate RO and then set via the transferring gate D in a position which corresponds with the position of the counter $T_1$ at this instant. This means the following: For the time of filling fully the counter $T_1$ with clock pulses, said time having the length of one scan with the aid of a sawtooth period, the counter $T'_1$ is available for determining the centers of character line elements: as long as a light signal is present as a video signal, the counter $T'_1$ changes in parallel with $T_1$ (gate 63 is open). If there is a line element intersection, counter $T'_1$ counts on with half the clock pulse frequency (gate 63 is closed and gate 64 is open) because line 62 is at a potential. At the instant of termination of the element intersection, when a signal appears at the output 8 of the detector 60 due to the dark-light transition, the counter position $C_1$ of counter $T'_1$ is read via RO. This position $= C_1$ is a digital representation of the place of the center of the intersection in the scan concerned. The relevant scan is represented by the position $C_2$ of the scanning line counter $T_2$ at the instant concerned. This position $C_2$ is controlled from the detector output 8 at the instant of a light-dark transition at the output $1T_2$ and derived from the counter $T_2$. These two counter positions $C_1$ and $C_2$ in common with the above-mentioned position $FF_0$ of the bistable trigger FF of the electronic switch 3 provide an unambiguous representation of the center. These binary values can be further processed for recognizing the character after being supplied, for example, to a (register) store (cf. FIG. 4 with the description). After reading the position $C_1$ of counter $T'_1$ the position of this counter is again adapted to the correct position of the electron beam at the scan concerned in order to serve at any subsequent intersection during the same scan again for a correct determination of the center. For this purpose the counter $T'_1$ takes over via the transferring switch D the position of the counter $T'_1$ at the instant concerned, which is always a representation of the scanning position of the electron beam in the scanning direction concerned.

The devices according to the invention may be extended by a checking device which suppresses dark signals of excessive duration and light- and dark-signals of too short a duration. An example of such a checking device is shown in FIG. 6.

Figure 6:
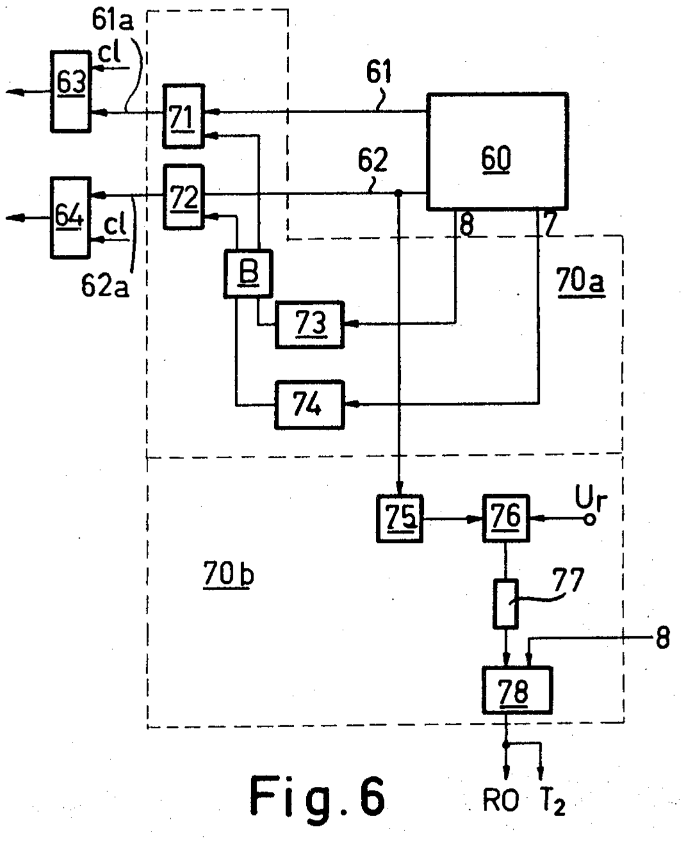
FIG. 6 shows an extension of the devices in accordance with the invention.

FIG. 6 shows a first checking device 70a for use in the device of FIG. 5. The checking device 70a comprises AND-gates 71 and 72, delay circuits 73 and 74 and a bistable trigger B. A second checking device 70b comprises an integrator 75, a comparison circuit 76, an inverter 77 and an AND-gate 78. A dark-light transition pulse at the output 8 of detector 60 changes over a bistable trigger B subsequent to delay in a delay circuit 73. A first output of this trigger B (which is than at the potential 1) is connected to the AND-gate 71, to which also the output 61 having the light signals of detector 60 is connected. Also a light-dark transition pulse at the output 7 of detector 60 changes over the trigger B to its other input subsequent to delay in circuit 74. The second output of the trigger B, which is then at potential 1, is connected to the AND-gate 72, to which is also connected the output 62 having the dark signals of detector 60. It is thus achieved that the AND-gate 71 or 72 transfers a light or dark signal respectively through the line 61a or 62a respectively to the AND-gate 63 or 64 respectively (see FIG.5) only when a light signal or a dark signal respectively has at least a period equal to the time by which the dark-light transition pulse or the light-dark transition pulse respectively is delayed. In this manner light and dark signals of shorter duration than said delay time are suppressed for a further use in determining the centers of the line elements. Light spots in a dark region and dark spots in a light region are thus ignored. This is very advantageous because these spots do not provide information about the character and have to be considered as unwanted information. In the second checking device it is ensured that no center data of dark signals of long duration are given. This may be important, if it is not desired to assess the centers in the direction of width of character line elements. See for example the closed spots on the lines $H_2$ and $H_3$ of FIG. 1. These spots are not direct character center line points. In order to ignore these points the checking device 70b comprises an integrator 75, in which the dark signal at the output 62 of detector 60 is integrated. When the output voltage of the integrator applied to a comparison circuit 76 exceeds a given voltage value $U_r$, no signal is present, after an inverter 77, at the and-gate 78 for transferring, at the appearance of a dark-light transition pulse at the output 8 of detector 60, a read instruction to the read device RO and the counter $T_2$. Thus the center data of the relevant line element are not transferred to the outputs $C_1$ and $C_2$. The value of the voltage $U_r$ is determined by what is desired and what is not desired as the center of a dark region representing a character center line point.

It should be noted that it is also possible to display a character for example on two light-sensitive elements. When scanning is performed on one element in a given direction and in a direction transverse thereof on the other element, the center data of the two scanning directions may be simultaneously determined by one of the devices mentioned above.

What is claimed is:

1. A device for determining the line passing through the centers of line elements of a character, comprising a first sawtooth generator means for providing a repetitive output signal having a linearly increasing magnitude, display means for scanning a character in response to the magnitude of the signal from the sawtooth generator as a raster-type scan in two orthogonal directions and for providing a video output signal corresponding to said scanned character, detector means for providing separate output signals in response to light-dark and dark-light transitions of the video signal, a second sawtooth generator means for providing an output signal having a magnitude that increases linearly at a rate equal to one-half the rate of the output signal from the first sawtooth generator means in response to the output signals from the detector means, and summation means for adding the output signals from the first and the second sawtooth generator means wherein the output of the summation means at the termination of the output signal of the second sawtooth generator means corresponds to the center line of the portion of the image scanned by the scanning means.

2. A device as claimed in claim 1, wherein a display device is provided on which the sum voltages representing the centers can be displayed synchronously with the scans.

3. A device as claimed in claim 1, wherein there is provided a store in which the sum voltages representing the character line element centers of a scan are stored subsequent to digitalization in an analogue-digital converter with the aid of the position of a scanning line counter in relation to said scan.

4. A device as claimed in claim 1 in which the part of which a character has to be displayed in a light-sensitive element which can be scanned by an electron beam controlled by a sawtooth generator and a step generator, and wherein a video signal appears at the output during a scan, wherein the sawtooth generator and the step generator are the means for scanning in at least two transverse scanning directions, wherein the detection means comprises a detector for detecting from the video signal the light and dark signals occurring during the scan of the characters, wherein the center determining means comprises a first counter being filled with a clock pulse per scan in each of the at least two transverse scanning directions, a second counter operating in parallel with the first counter but counting on by half the clock pulse frequency under the control of the detector in response to an intersection of a character line element, whereby at the end of the intersection the position of the second counter can be read as a digital representation of the center of a character line element in a scan in the relevant scanning direction simultaneously with the counter position of a scanning line counter as center co-ordinates, the second counter taking over the counter position of the first counter at the termination of an intersection.

5. A device as claimed in claim 1 wherein two light-sensitive elements are provided on which a character is displayed, the character being scanned simultaneously on the first light-sensitive element in a first direction and on the second light-sensitive element in a second direction transverse of the first direction.

6. A device as claimed in claim 1, wherein a first checking device is provided in which non-relevant light and dark signals of too short a duration for determining the center of a character line element are suppressed.

7. A device as claimed in claim 1, wherein a second checking device is provided in which non-relevant center data of the dark signals of too long a duration are suppressed.

* * * * *